United States Patent
Bastide et al.

(10) Patent No.: US 10,778,616 B2
(45) Date of Patent: Sep. 15, 2020

(54) PROPAGATING ONLINE CONVERSATIONS

(71) Applicant: INTERNATIONAL BUSINESS MACHINES CORPORATION, Armonk, NY (US)

(72) Inventors: Paul R. Bastide, Boxford, MA (US); Matthew E. Broomhall, Goffstown, NH (US); Robert E. Loredo, North Miami Beach, FL (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/043,243

(22) Filed: Jul. 24, 2018

(65) Prior Publication Data
US 2020/0036657 A1   Jan. 30, 2020

(51) Int. Cl.
  *H04L 12/58*   (2006.01)
  *H04L 29/08*   (2006.01)

(52) U.S. Cl.
  CPC .............. *H04L 51/02* (2013.01); *H04L 51/32* (2013.01); *H04L 67/22* (2013.01)

(58) Field of Classification Search
  USPC .......................................................... 709/206
  See application file for complete search history.

(56) References Cited

U.S. PATENT DOCUMENTS

| | | | |
|---|---|---|---|
| 7,953,814 B1 | 5/2011 | Chasin et al. | |
| 9,330,378 B2 | 5/2016 | Bastide et al. | |
| 9,485,212 B1 | 11/2016 | Bastide et al. | |
| 2011/0258561 A1* | 10/2011 | Ladouceur | G06Q 10/103 715/753 |
| 2012/0246252 A1* | 9/2012 | Denise | G06Q 10/107 709/206 |

(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Hermon Asres
(74) *Attorney, Agent, or Firm* — Alexis N. Hatzis

(57) ABSTRACT

The method, computer program product and computer system may include computing device which may analyze a user's online conversations for the frequency of received messages. Online conversations may be messages and postings between the user and a group of users. The group of users may communicate via devices over an electronic communications network and the online conversations and posting may be done on an online messaging platform. The computing device may determine a gap in an online conversation when the received messages is below the determined frequency of received messages. The computing device may identify an originator of the online conversation. The computing device may analyze the attributes of the online conversation and generate a message based on the attributes to alert the user of the gap in the online conversation. The computing device may send the message to prompt the originator to continue the online conversation.

20 Claims, 8 Drawing Sheets

(56) References Cited

U.S. PATENT DOCUMENTS

| | | | |
|---|---|---|---|
| 2014/0172845 A1* | 6/2014 | Rabe | G06Q 50/01 707/728 |
| 2015/0341305 A1 | 11/2015 | Bastide et al. | |
| 2016/0285807 A1 | 9/2016 | Bastide et al. | |
| 2016/0301646 A1 | 10/2016 | Abou Mahmoud et al. | |
| 2017/0034290 A1 | 2/2017 | Abou Mahmoud et al. | |
| 2017/0118348 A1* | 4/2017 | Dotan-Cohen ... | H04M 3/42365 |
| 2017/0324697 A1 | 11/2017 | Bastide et al. | |

OTHER PUBLICATIONS

Gibbs et al., "A Visualization Tool for Managing and Studying Online Communications", Educational Technology and Society, vol. 9, No. 3, 2006, pp. 232-243.

Disclosed Anonymously, "Method and System for Composing a Social Media Post Based on Daily Interactions of a User", An IP.com Prior Art Database Technical Disclosure, IP.com No. IPCOM000236492D, Publication Date: Apr. 29, 2014, p. 1.

Disclosed Anonymously, "Method and System for Initiating a Conversation between Users through a Computer Agent based on Profile and Interests of the Users", An IP.com Prior Art Database Technical Disclosure, IP.com No. IPCOM000243036D, Publication Date: Sep. 9, 2015, pp. 1-2.

Kalman et al., "Pauses and Response Latencies: A Chronemic Analysis of Asynchronous CMC", Journal of Computer-Mediated Communication, vol. 12, 2006, pp. 1-23.

Ranganath et al., "Facilitating Time Critical Information Seeking in Social Media", IEEE Transactions on Knowledge and Data Engineering, vol. 29, No. 10, Oct. 2017, pp. 2197-2209.

Saito et al., "Detecting Changes in Content and Posting Time Distributions in Social Media", 2013 IEEE/ACM International Conference on Advances in Social Networks Analysis and Mining, ASONAM'13, Aug. 25-29, 2013, pp. 572-578.

Wang et al., "From User Comments to On-line Conversations", KDD'12, Aug. 12-16, 2012, pp. 244-252.

* cited by examiner

PROPAGATING ONLINE CONVERSATIONS

BACKGROUND

The present invention relates generally to a method, system, and computer program for propagating online conversations. More particularly, the present invention relates to a method, system, and computer program for propagating frequent online social media conversations when a gap in the conversation is detected.

Online social networks have become the universal mechanism to connect people and information in logical and organized ways. Online social networks enable sharing and processing of information between users. The most common mechanisms of sharing and processing information is a wall, activity stream, timeline and/or profile. These mechanisms enable one to rapidly share information with others and gather information from others in the online social networks. These streams of data are often delivered on a continuous basis, and therefore drive habits and expectations. For example, a user may follow a newspaper's social media feed, which puts out content every hour. The consuming user relies on this continuous data output to shape their impression of the day and stay engaged with his network. When these habitual, pattern-based conversations disappear, there may be a need to continue the conversation by the consumer or prompt the sender to continue the conversation by the consumer.

BRIEF SUMMARY

An embodiment of the invention may include a method, computer program product and computer system for propagating an online conversation using an electronic communications network. The method, computer program product and computer system may include computing device which may analyze a user's online conversations for the frequency of received messages. Online conversations may be messages and postings between the user and a group of users. The group of users may communicate via devices over an electronic communications network and the online conversations and posting may be done on an online messaging platform electronically accessible by the group of users and a plurality of other users. The computing device may determine a gap in an online conversation. The gap may be determined when the received messages is below the determined frequency of received messages by the user from one or more users of the group of users. The computing device may identify an originator of the online conversation when the gap is detected. The computing device may analyze the attributes of the online conversation and generate a message to the originator based on the attributes of the online conversation to alert the user of the gap in the online conversation. The computing device may send the message to the originator to prompt the originator to continue the online conversation.

DETAILED DESCRIPTION

Figure 1:
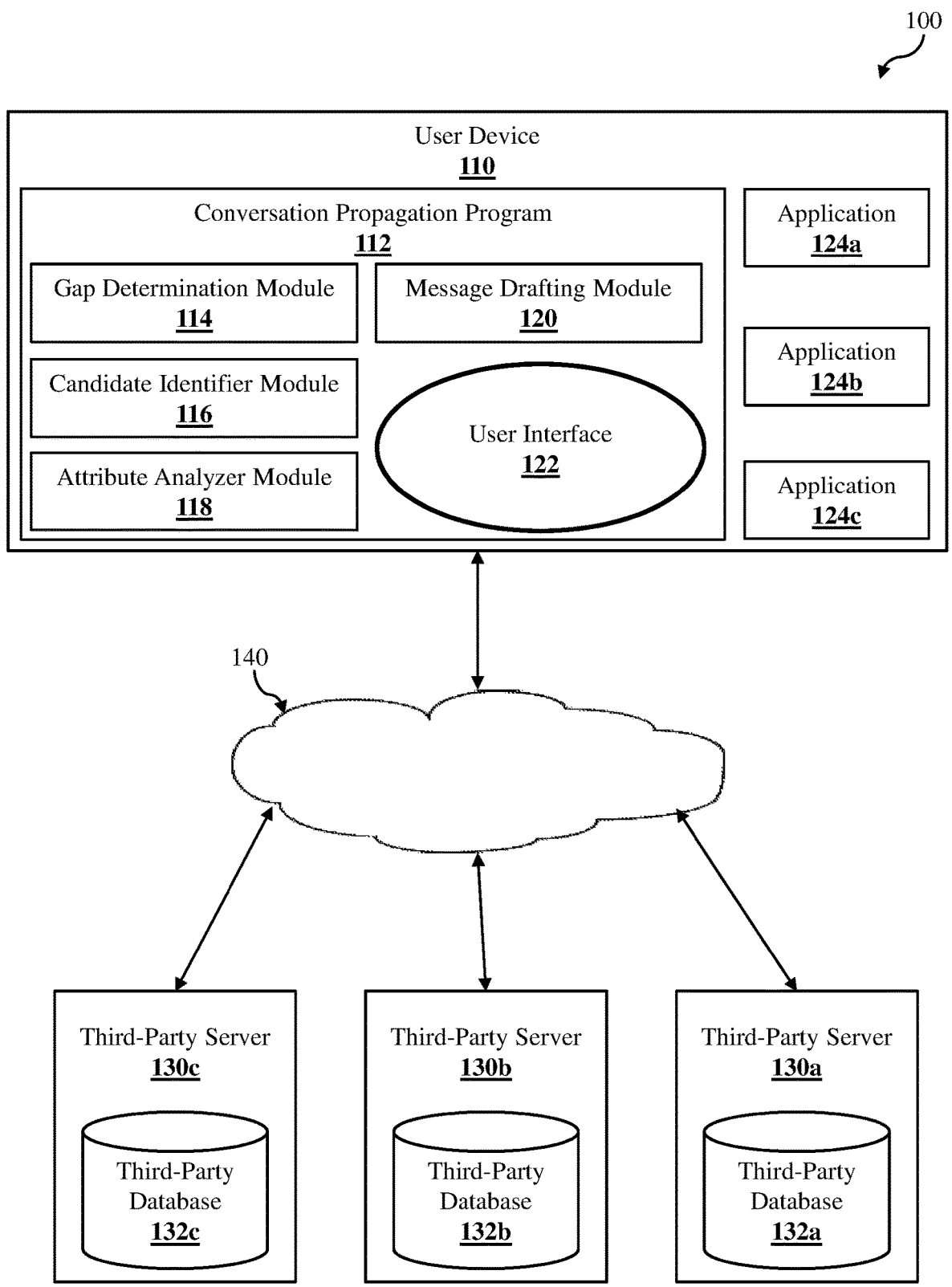
FIG. 1 illustrates a system for propagating online conversations, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout. Embodiments of the invention are generally directed to a system for analyzing, predicting, and alerting an offline user as to the update status of a master digital file.

FIG. 1 illustrates an online conversation propagation system 100, in accordance with an embodiment of the invention. In an example embodiment, online conversation propagation system 100 may include user device 110, and third-party servers 130*a*, 130*b*, 130*c* interconnected via network 140.

In the example embodiment, the network 140 is the Internet, representing a worldwide collection of networks and gateways to support communications between devices connected to the Internet. The network 140 may include, for example, wired, wireless or fiber optic connections. In other embodiments, the network 140 may be implemented as an intranet, a local area network (LAN), or a wide area network (WAN). In general, the network 140 can be any combination of connections and protocols that will support communications between the user device 110 and the third-party servers 130a, 130b, 130c.

The user device 110 may include conversation propagation program 112, and applications 124a, 124b, 124c. In the example embodiment, the user device 110 may be a desktop computer, a notebook, a laptop computer, a tablet computer, a thin client, or any other electronic device or computing system capable of storing compiling and organizing audio, visual, or textual content and receiving and sending that content to and from other computing devices, such as the third-party servers 130a, 130b, 130c, and other user devices 110 via the network 140. The user device 110 is described in more detail with reference to FIG. 4. While only a single user device 110 is illustrated, it can be appreciated that any number of user devices 110 may be part of the online conversation propagation system 100.

The conversation propagation program 112 may include a gap determination module 114, a candidate identifier module 116, an attribute analyzer module 118, a message drafting module 120, and a user interface 122. The conversation propagation program 112 is a program capable of analyzing a user's online conversations on the applications 124a, 124b, 124c, detecting a gap in one or more of those online conversations using the gap determination module 114, and prompting the user to continue the one or more online conversations. An online conversation as used herein refers to any online data communication system, such as, but not limited to, a social media network, an online email system, or any online messaging system in which a user receives regular information updates. For example, a user may follow a colleague on a social media platform and the colleague's social media feed would be recognized as an online conversation by the conversation propagation program 112. Further, the conversation propagation program 112 would analyze the colleague's social media feed to determine the frequency with which the colleague posts on his or her social media feed. The gap determination module 114 of the conversation propagation program 112 would then be able to detect any gap in the frequency of the colleague's posts on the social media feed which the user has come to expect. For example, the conversation propagation program 112 may determine that a user's colleague posts an update on a social media feed once a day. The gap determination module 114 of the conversation propagation program 112 may then detect that the user's colleague has not posted on his or her social media feed within the last 24 hours. Once the conversation propagation program 112 has detected a gap in the online conversation between the user and the colleague, conversation propagation program 112 may further analyze the online conversation, i.e. the colleague's social media feed, using the attribute analyzer module 118 and then formulate a proposed message for the user to send to the colleague, using the message drafting module 120, to maintain and propagate the online conversation. The attribute analyzer module 118 of the conversation propagation program 112 may further analyze the online conversation, i.e. the colleague's social media feed, to determine a pattern of attributes of the online conversation such as, but not limited to, the content topic(s), the quality of the content, the sentiment of the content, the users able to view the content, the grammar of the content, frequently used hashtags, names mentioned, and locations mentioned, e.g. tagged subjects, etc. The message drafting module 120 of the conversation propagation program 112 will then formulate a draft message for the user to send to the colleague based on pattern analysis of the online conversation.

The user interface 122 includes components used to receive input from a user on the user device 110 and transmit the input to the conversation propagation program 112, or conversely to receive information from the conversation propagation program 112 and display the information to the user on the user device 110. In an example embodiment, the user interface 122 uses a combination of technologies and devices, such as device drivers, to provide a platform to enable users of user device 110 to interact with the conversation propagation program 112. In the example embodiment, user interface 122 receives input, such as textual input received from a physical input device, such as a keyboard.

The applications 124a, 124b, 124c be any online social network or online messaging application such as, but not limited to, social media applications, email applications, and instant messaging applications, etc. Examples of such applications 124a, 124b, 124c may be Twitter®, Facebook®, IBM® Connections, Jive®, Yammer®, Microsoft Outlook®, Gmail®, Lotus Notes®, etc. While three applications 124a, 124b, 124c are illustrated, it can be appreciated that any number of applications 124 may be part of the online conversation propagation system 100 including less than three or more than three depending on the user. As described in the example above, application 124a, 124b, 124c may be a social media platform such as Twitter®. Thus, the conversation propagation program 112 may use data associated with the application 124a, 124b, 124c to analyze a user's online conversations on application 124a, determine the frequency those conversations, detect a gap in one or more of those online conversations using the gap determination module 114, and prompt the user to continue the one or more online conversations as discussed above and in more detail below with reference to FIG. 3. The data associated with applications 124a, 124b, 124c may be stored on third-party servers 130a, 130b, 130c associated with the application 124a, 124b, 124c, respectively. For example, a user on user device 110 may have Facebook®, Twitter®, and Gmail® accounts, i.e. applications 124a, 124b, 124c, and the data associated with each application 124a, 124b, 124c would be stored on the Facebook, Twitter, and Gmail® servers, i.e., third-party servers 130a, 130b, 130c.

The third-party servers 130a, 130b, 130c may include third-party databases 132a, 132b, 132c. While three third-party servers 130a, 130b, 130c are illustrated, it can be appreciated that any number of third-party servers 130 may be part of the online conversation propagation system 100 including less than three or more than three depending on the user. In the example embodiment, the third-party servers 130a, 130b, 130c may be a desktop computer, a notebook, a laptop computer, a tablet computer, a thin client, or any other electronic device or computing system capable of storing compiling and organizing audio, visual, or textual content and receiving and sending that content to and from other computing devices, such as the user device 110 via the network 140. In some embodiments, the third-party servers 130a, 130b, 130c include a collection of devices or data sources. The third-party servers 130a, 130b, 130c are described in more detail with reference to FIG. 4.

The third-party databases 132a, 132b, 132c may be a collection of online conversation data including, but not limited to, audio, visual, and textual files. For example, the third-party databases 132a, 132b, 132c may include social media feed posts, online messages, emails, tweets, etc. The third-party databases 132a, 132b, 132c located on the third-party servers 130a, 130b, 130c can be accessed through using the network 140.

Figure 2:
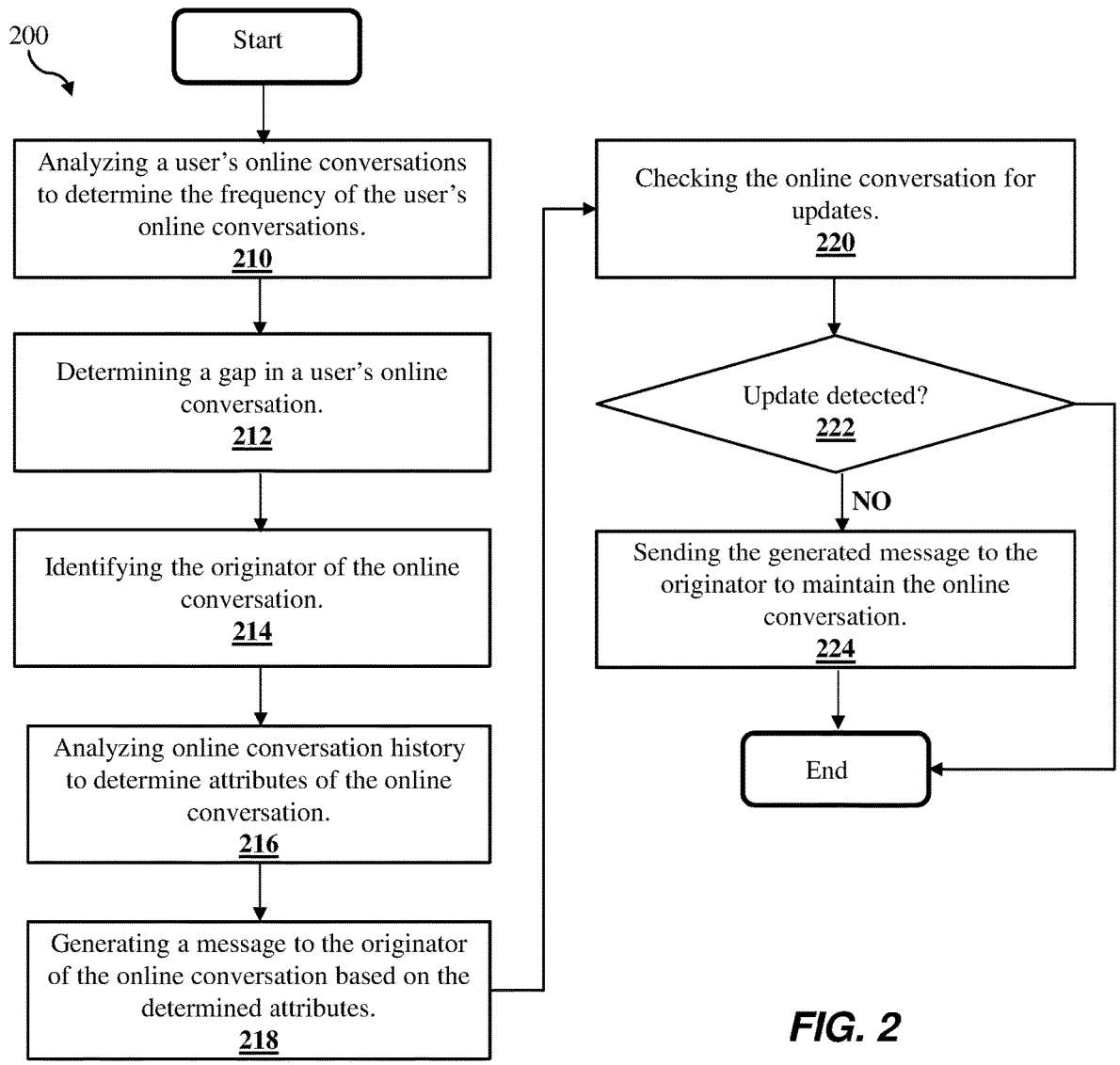
FIG. 2 is a flowchart illustrating an example method of the online conversation propagation system, in accordance with an embodiment of the invention.

Referring to FIG. 2, a method 200 for propagating online conversations is depicted, in accordance with an embodiment of the present invention.

Referring to block 210, the conversation propagation program 112 may analyze a user's online conversations on the applications 124a, 124b, 124c to determine the frequency of the user's online conversations with the user's contacts on the applications 124a, 124b, 124c. For Example, the conversation propagation program 112 may analyze application 124a, e.g. a social media platform, and determine that the user follows a colleague, i.e. the conversation originator, who posts an update once a day. Thus, the conversation propagation program 112 determines that the user has an online conversation with the colleague once a day where the colleagues posts an update. In an embodiment of the invention, the conversation propagation program 112 may initiate the analysis of a user's online conversations based on a user's input on the user interface 122 of the conversation propagation program 112. In yet another embodiment of the invention, the conversation propagation program 112 may initiate the analysis of a user's online conversations based on a pre-programmed period of time. For example, the conversation propagation program 112 may be programmed to run an analysis of a user's online conversations every eight hours, once a day, once a week, or once a month, etc.

Referring to block 212, the conversation propagation program 112, using the gap determination module 114, determines a gap in a user's online conversation on one or more of the applications 124a, 124b, 124c. For example, if the conversation propagation program 112 determined that an entity on application 124a posts an update on application 124a once a day, the conversation propagation program 112 would determine that a gap in that online conversation exists if the conversation originator did not post an update in the 24 hours following a previous update.

Referring to block 214, the conversation propagation program 112, using the candidate identifier module 116, identifies the originator, i.e. user contact on application 124a, of the online conversation. The originator may be any account associated with the applications 124a, 124b, 124c. For example, the originator may be an Twitter® handle, a Facebook® account, an email address, etc.

Referring to block 216, the conversation propagation program 112, using the attribute analyzer module 118, may analyze the online conversation with the detected gap, i.e. the colleague's social media feed, to determine a pattern of the online conversation. For example, the conversation propagation program 112 may determine certain attributes of the online conversation such as, but not limited to, the content topic(s), the quality of the content, the sentiment of the content, the users able to view the content, the grammar of the content, frequently used hashtags, names mentioned, and locations mentioned, e.g. tagged subjects, etc.

Referring to block 218, the conversation propagation program 112, using message drafting module 120, may generate a message to the originator of the online conversation. The conversation propagation program 112 may generate a message based on the attributes identified at block 216. For example, the conversation propagation program 112 may determine at block 216 that the user's colleague frequently tags a specific location and a company name in his or her posts. Thus, the conversation propagation program 112 may generate a message that includes the location and company name. As an example, the colleague may post daily sales updates like "Sales at Company X, New York, N.Y. office are up". Thus, if the conversation propagation program 112 determines that the colleague has not posted a sales update in the 24 hours since the last sales update, the conversation propagation program 112 may generate a message such as "How are sales at the Company X office today?"

Referring to block 220, the conversation propagation program 112 may check the online conversation for updates. Updates to the online conversation may include any message, post, or update received on the applications 124a, 124b, 124c. For example, the user's colleague may have posted a sales update on the application 124a, i.e. the social media platform, while the conversation propagation program 112 was generating the message. In yet another embodiment of the invention, the conversation propagation program 112 may passively detect an update to the online conversation. For example, the conversation propagation program 112 may detect the user has received a push event, i.e. an update notification, on user device 110 from application 124a.

Referring to block 222, if the conversation propagation program 112 detects that the online conversation has been updated by the originator of the online conversation, the conversation propagation program 112 may terminate the method. However, if the conversation propagation program 112 determines that no update to the online conversation has occurred, the conversation propagation program 112 may proceed to block 224.

Referring to block 224, the conversation propagation program 112 sends the generated message to the originator of the online conversation through the application 124a.

Figure 3:
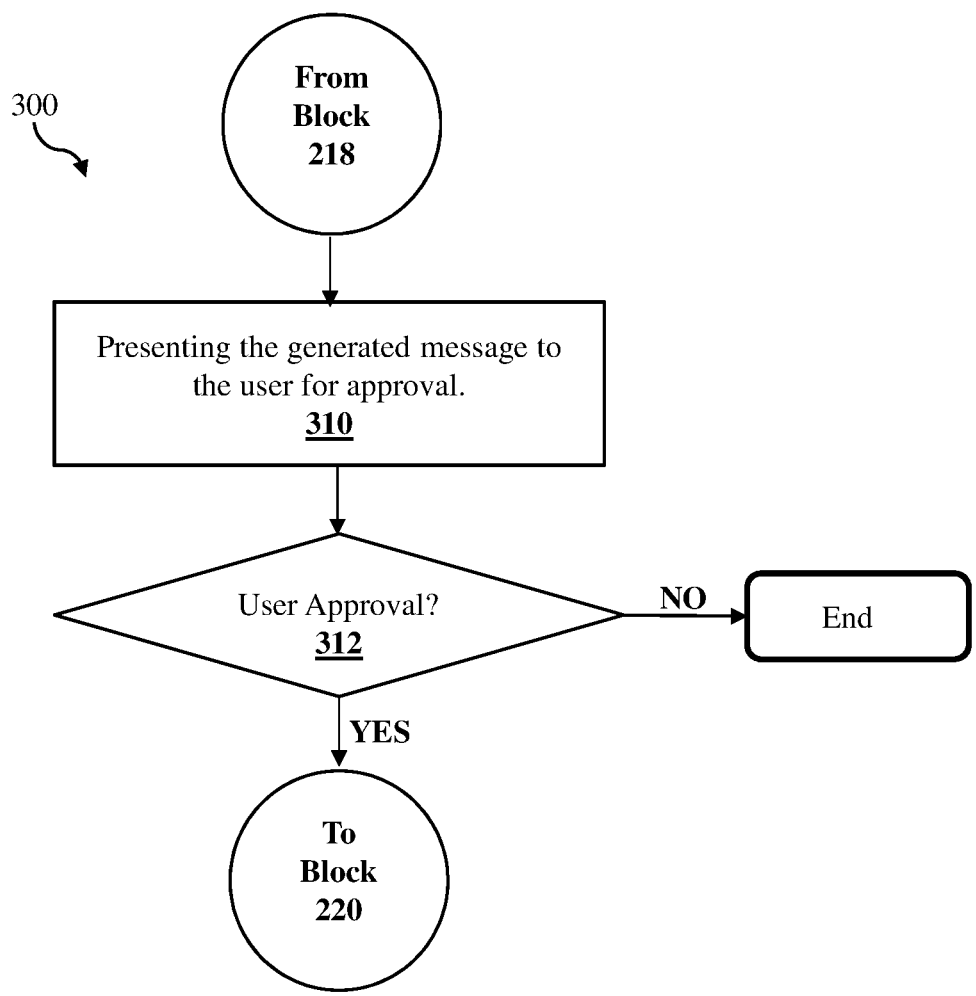
FIG. 3 is a flowchart illustrating an example method of the online conversation propagation system, in accordance with an embodiment of the invention.

Referring to FIG. 3, another example method 300 for propagating online conversations is depicted, in accordance with an embodiment of the present invention. The embodiment of FIG. 3 illustrates an alternative embodiment of the method 200.

Referring to block 310, the conversation propagation program 112 may present the generated message to the user for approval. For example, the conversation propagation program 112 may present the generated message to the user using the user interface 122. Alternatively, the conversation propagation program 112 may present the message as a pop-up or push notification on user device 110.

Referring to block 312, if the user approves the message, the conversation propagation program 112 may continue to block 220, as described above with reference to FIG. 2. If the user does not approve the message to be sent to the originator of the online conversation, the method may terminate. The user may approve the message using the user interface 122. In another embodiment of the invention, the message may be deemed "approved" or "not approved" upon the passage of a pre-programmed period of time without user action.

Figure 4:
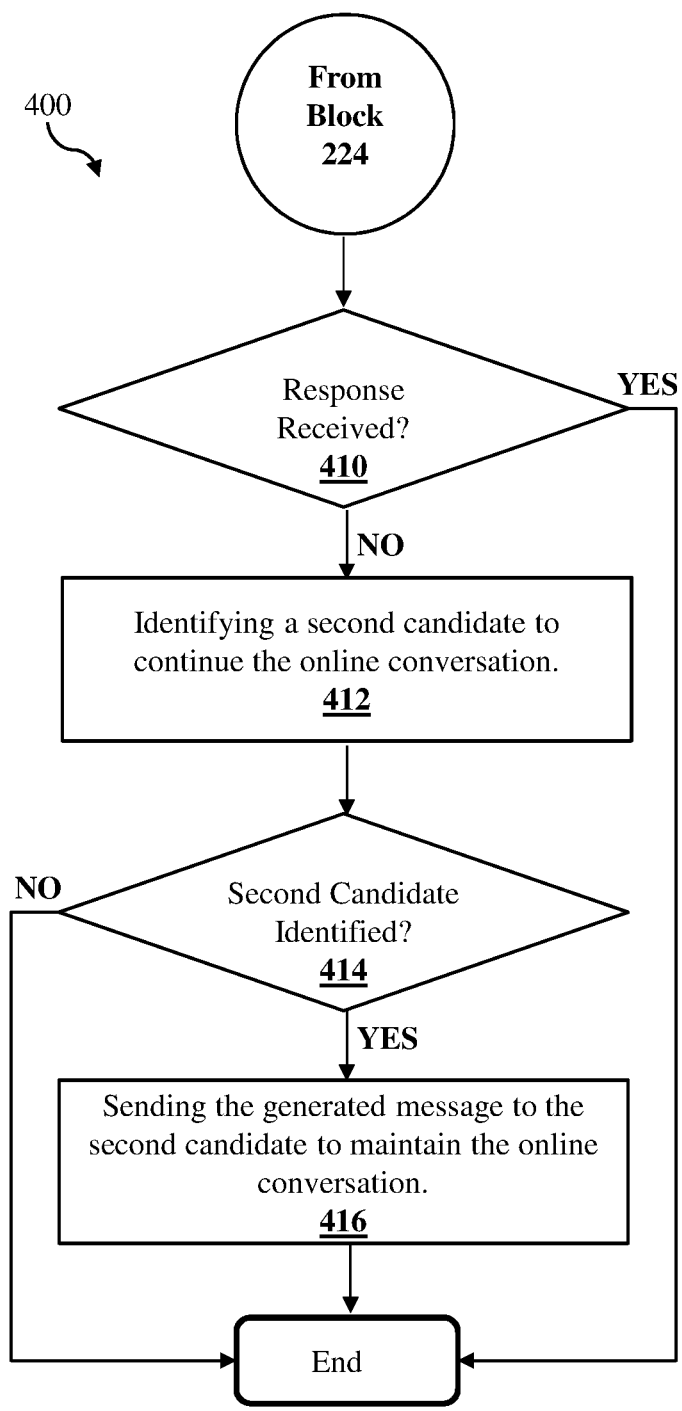
FIG. 4 is a flowchart illustrating an example method of the online conversation propagation system, in accordance with an embodiment of the invention.

Referring to FIG. 4, another example method 400 for propagating online conversations is depicted, in accordance with an embodiment of the present invention. The embodiment of FIG. 3 illustrates an alternative embodiment of the methods 200, 300.

Referring to block 410, the conversation propagation program 112 may determine if a response from the originator of the online conversation has responded to the sent message. If the conversation propagation program 112 determines that a response has been received at block 410, the method may terminate. However, if the conversation propagation program 112 determines that no response has been received at block 410, the conversation propagation program 112 may identify a second candidate to receive the generated message at block 412. For example, if the originator of the online conversation is a sales manager of a company, the conversation propagation program 112 may scan the application 124a for a sales representative of the same company. As another example, if the online conversation is an email thread, conversation propagation program 112 may identify someone who has been copied on one or more of the emails as the second candidate.

Referring to block 414, if the conversation propagation program 112 is unable to identify a second candidate, the method may terminate. However, if the conversation propagation program 112 identifies a second candidate at block 414, the conversation propagation program 112 may send the generated message to the second candidate at block 416. It can be appreciated that the steps described in blocks 410-416 may be repeated until either a response is received or until no other candidates can be identified by the conversation propagation program 112.

Figure 5:
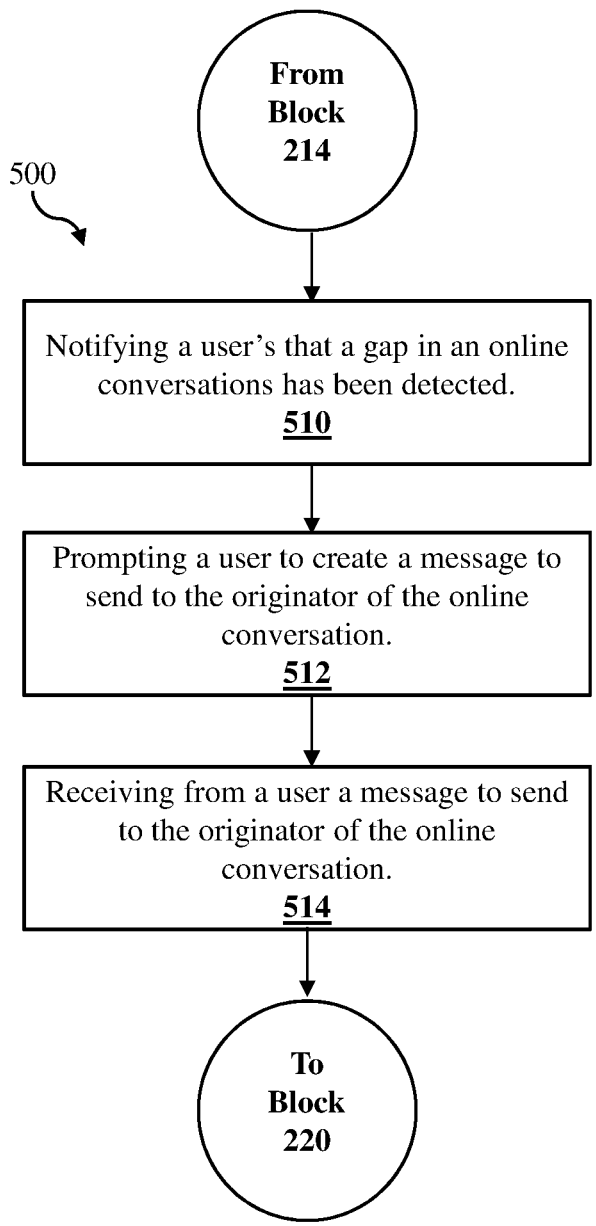
FIG. 5 is a flowchart illustrating an example method of the online conversation propagation system, in accordance with an embodiment of the invention.

Referring to FIG. 5, another example method 500 for propagating online conversations is depicted, in accordance with an embodiment of the present invention. The embodiment of FIG. 3 illustrates an alternative embodiment of the methods 200.

Referring to block 510, the conversation propagation program 112 may notify the user on the user device 110 that a gap has been detected in an online conversation on one or more of the applications 124a, 124b, 124c. The conversation propagation program 112 may notify the user on user device 110 using the user interface 122. In another embodiment of the invention, the conversation propagation program 112 may notify the user on user device 110 by creating a notification on the desktop of the user device 110.

Referring to block 512, the conversation propagation program 112 prompts the user to create a message to the originator of the online conversation. The conversation propagation program 112 may prompt the user through the user interface 122. In another embodiment of the invention, the conversation propagation program 112 may prompt the user on user device 110 by creating a notification on the desktop of the user device 110. It may be appreciated that the action described with reference to blocks 510 and 512 may be done simultaneously or separately.

Referring to block 514, the conversation propagation program 112 receives a message from the user on the user device 110 and proceeds to block 220 as described above with reference to FIG. 2. The user may create the message on user device 110 using the user interface 122. Further, the conversation propagation program 112 may provide the user with form messages to send on user interface 122. For example, user interface 122 may include a drop-down menu of sample or form messages or excerpts of messages, which the user may include in his or her message to the originator of the online conversation.

Figure 6:
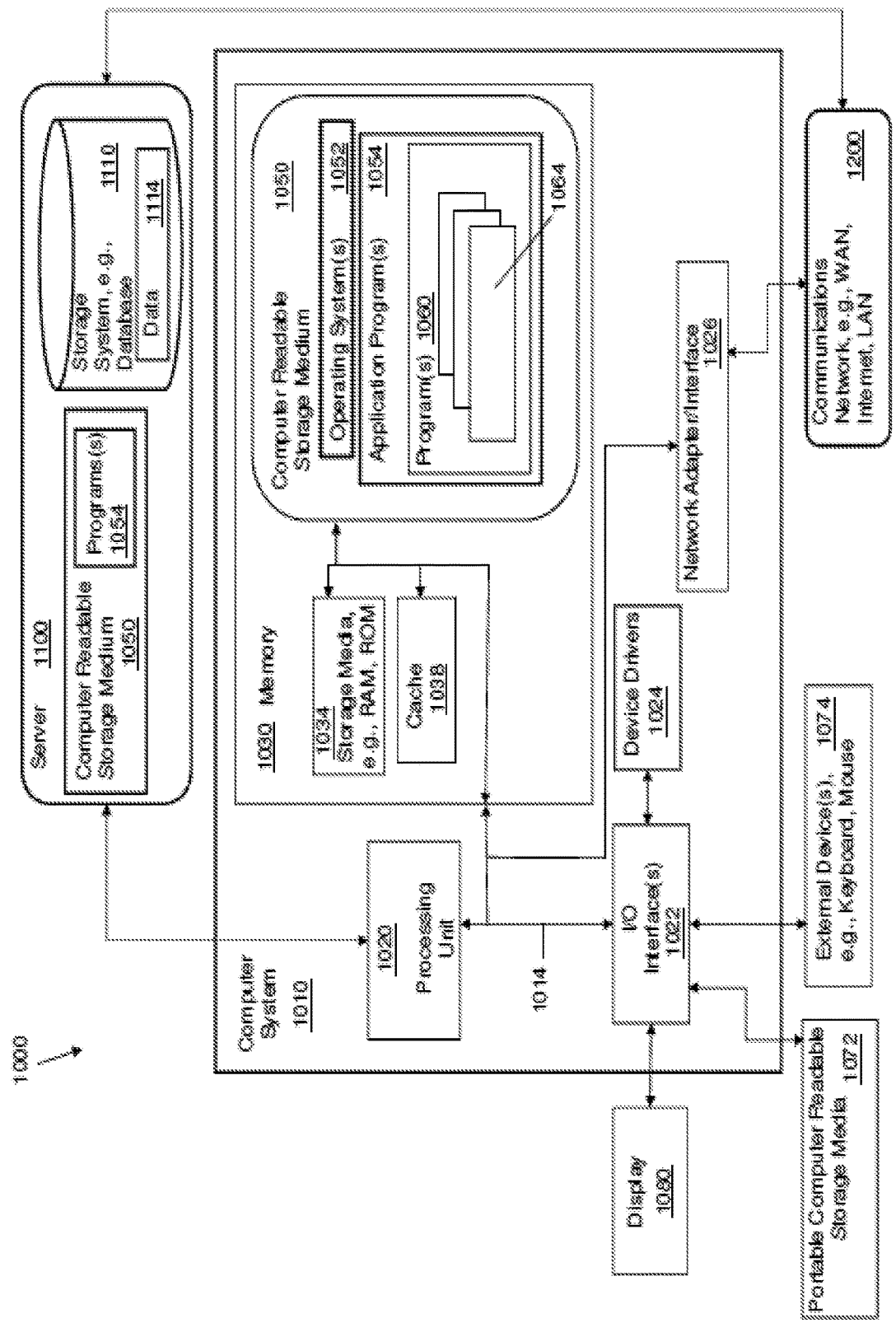
FIG. 6 is a block diagram depicting the hardware components of the digital file update prediction system of FIG. 1, in accordance with an embodiment of the invention.
Figure 7:
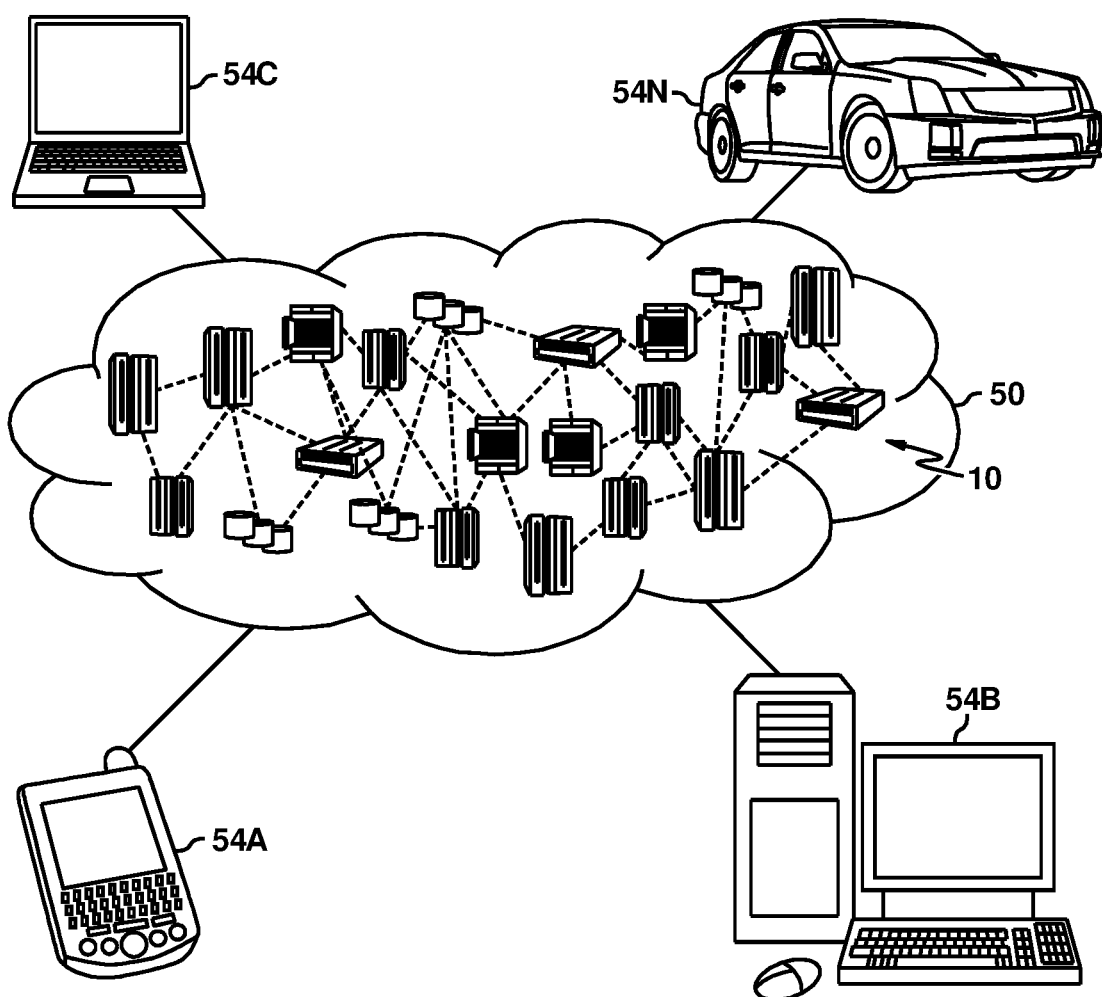
FIG. 7 illustrates a cloud computing environment, in accordance with an embodiment of the invention.

Referring to FIG. 6, a system 1000 includes a computer system or computer 1010 shown in the form of a generic computing device. The methods 200, 300, 400, and 500, for example, may be embodied in a program(s) 1060 (FIG. 6) embodied on a computer readable storage device, for example, generally referred to as memory 1030 and more specifically, computer readable storage medium 1050 as shown in FIG. 6. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 7 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 6 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 6, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The methods 200, 300, 400, and 500 (FIGS. 2-5), for example, may be embodied in one or more computer programs, generically referred to as a program(s) 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 8:
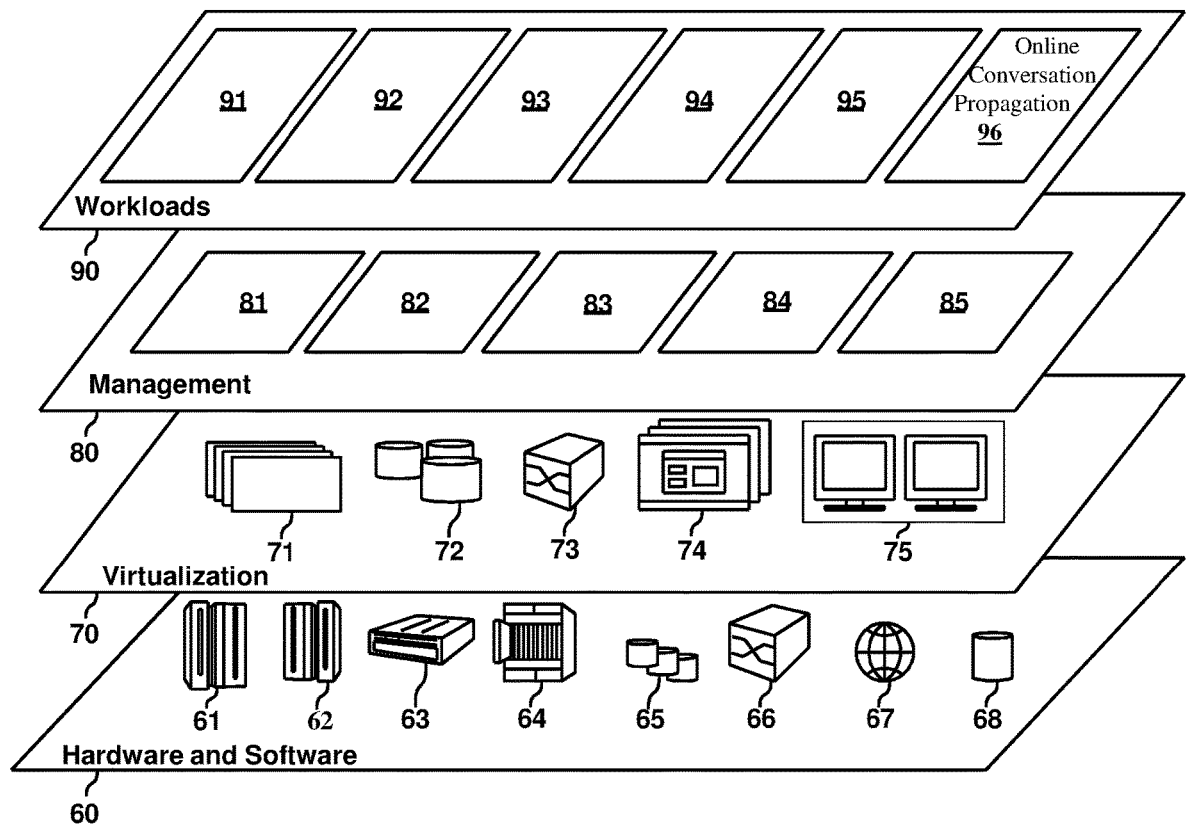
FIG. 8 illustrates a set of functional abstraction layers provided by the cloud computing environment of FIG. 7, in accordance with an embodiment of the invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and file update prediction 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for propagating an online conversation using an electronic communications network, the method comprising:
   analyzing, by a computing device, a user's online conversations for frequency of received messages, wherein the online conversations comprise messages and postings between the user and a group of users including the user, the group of users communicating via devices over an electronic communications network and the online conversations and posting being on an online messaging platform electronically accessible by the group of users and a plurality of other users;
   determining, by the computing device, a gap in an online conversation, the gap being determined when the received messages is below the determined frequency of received messages by the user from one or more users of the group of users;
   identifying, by the computing device, an originator of the online conversation when the gap is detected;
   analyzing, by the computing device, attributes of the online conversation, wherein the attributes relate to a content of the online conversation and which attributes determine a pattern of the online conversation, wherein the pattern is used to determine that a message should be generated;
   generating, by the computing device, the message to the originator based on the attributes and determined pattern of the online conversation to alert the user of the gap in the online conversation; and
   sending, by the computing device, the message to the originator to prompt the originator to continue the online conversation.

2. A method as in claim 1, further comprising:
   detecting, by the computing device, an update to the online conversation;
   terminating, by the computing device, the generated message if an update to the online conversation is detected.

3. A method as in claim 1, further comprising:
   presenting, by the computing device, the generated message to the user for approval.

4. A method as in claim 1, further comprising:
   determining, by the computing device, a lack of response to the sent message from the identified originator of the online conversation;
   identifying, by the computing device, a second candidate to continue the online conversation, based on the second candidate being included on an email chain with the identified originator; and
   sending, by the computing device, by the first computing device, the generated message to the identified second candidate to maintain the online conversation.

5. A method as in claim 1, further comprising:
   notifying, by the computing device, the user of the gap detected in the online conversation;
   prompting the user, by the computing device, to create a message to the originator of the online conversation; and
   receiving, from a user on the computing device, a message to send to the originator of the online conversation.

6. The method of claim 1, wherein the online conversation occurs on a social network.

7. The method of claim 1, wherein the attributes of the online conversation include the topic, grammar, location, and tagged subjects of the conversation.

8. A computer program product for propagating conversation, the computer program product comprising:
   a computer-readable storage medium having program instructions embodied therewith, wherein the computer readable storage medium is not a transitory signal per se, the program instructions executable by a computer to cause the computer to perform a method, comprising:
     analyzing, by a computing device, a user's online conversations for frequency of received messages, wherein the online conversations comprise messages and postings between the user and a group of users including the user, the group of users communicating via devices over an electronic communications network and the online conversations and posting being on an online messaging platform electronically accessible by the group of users and a plurality of other users;
     determining, by the computing device, a gap in an online conversation, the gap being determined when the received messages is below the determined frequency of received messages by the user from one or more users of the group of users;
     identifying, by the computing device, an originator of the online conversation when the gap is detected;
     analyzing, by the computing device, attributes of the online conversation, wherein the attributes relate to a content of the online conversation and which attributes determine a pattern of the online conversation, wherein the pattern is used to determine that a message should be generated;
     generating, by the computing device, the message to the originator based on the attributes and determined pattern of the online conversation to alert the user of the gap in the online conversation; and sending, by the computing device, the message to the originator to prompt the originator to continue the online conversation.

9. The computer program product as in claim 8, further comprising:
   detecting, by the computing device, an update to the online conversation;
   terminating, by the computing device, the generated message if an update to the online conversation is detected.

10. The computer program product as in claim 8, further comprising:
   presenting, by the computing device, the generated message to the user for approval.

11. The computer program product as in claim 8, further comprising:
   determining, by the computing device, a lack of response to the sent message from the identified originator of the online conversation;
   identifying, by the computing device, a second candidate to continue the online conversation, based on the second candidate being included on an email chain with the identified originator; and
   sending, by the computing device, by the first computing device, the generated message to the identified second candidate to maintain the online conversation.

12. The computer program product as in claim 8, further comprising:
   notifying, by the computing device, the user of the gap detected in the online conversation;
   prompting the user, by the computing device, to create a message to the originator of the online conversation; and
   receiving, from a user on the computing device, a message to send to the originator of the online conversation.

13. The computer program product as in claim 8, wherein the online conversation occurs on a social network.

14. The computer program product as in claim 8, wherein the attributes of the online conversation include the topic, grammar, location, and tagged subjects of the conversation.

15. A system for propagating conversation, the system comprising:
   a computer system comprising, a processor, a computer readable storage medium, and program instructions stored on the computer readable storage medium being executable by the processor to cause the computer system to:
   analyze, by a computing device, a user's online conversations for frequency of received messages, wherein the online conversations comprise messages and postings between the user and a group of users including the user, the group of users communicating via devices over an electronic communications network and the online conversations and posting being on an online messaging platform electronically accessible by the group of users and a plurality of other users;
   determining, by the computing device, a gap in an online conversation, the gap being determined when the received messages is below the determined frequency of received messages by the user from one or more users of the group of users;
   identify, by the computing device, an originator of the online conversation when the gap is detected;
   analyzing, by the computing device, attributes of the online conversation, wherein the attributes relate to a content of the online conversation and which attributes determine a pattern of the online conversation, wherein the pattern is used to determine that a message should be generated;
   generating, by the computing device, the message to the originator based on the attributes and determined pattern of the online conversation to alert the user of the gap in the online conversation; and
   send, by the computing device, the message to the originator to prompt the originator to continue the online conversation.

16. The system as in claim 15, further comprising program instructions to:
   detect, by the computing device, an update to the online conversation;
   terminate, by the computing device, the generated message if an update to the online conversation is detected.

17. The system as in claim 15, further comprising program instructions to:
   present, by the computing device, the generated message to the user for approval.

18. The system as in claim 15, further comprising program instructions to:
   determine, by the computing device, a lack of response to the sent message from the identified originator of the online conversation;
   identify, by the computing device, a second candidate to continue the online conversation, based on the second candidate being included on an email chain with the identified originator; and
   send, by the computing device, by the first computing device, the generated message to the identified second candidate to maintain the online conversation.

19. The system as in claim 15, further comprising program instructions to:
   notify, by the computing device, the user of the gap detected in the online conversation;
   prompt the user, by the computing device, to create a message to the originator of the online conversation; and
   receive, from a user on the computing device, a message to send to the originator of the online conversation.

20. The system as in claim 15, wherein the attributes of the online conversation include the topic, grammar, location, and tagged subjects of the conversation.

* * * * *